(12) United States Patent
Heilper et al.

(10) Patent No.: US 8,583,510 B2
(45) Date of Patent: Nov. 12, 2013

(54) AUTOMATIC SALES ASSISTANT FOR ELECTRONIC COMMERCE CUSTOMERS

(75) Inventors: Andre Heilper, Haifa (IL); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 12/260,253

(22) Filed: Oct. 29, 2008

(65) Prior Publication Data

US 2010/0106614 A1    Apr. 29, 2010

(51) Int. Cl.
*G06Q 30/00* (2012.01)
(52) U.S. Cl.
USPC .......................................... 705/26.8; 705/27.1
(58) Field of Classification Search
USPC .................................................. 705/26–27.2
See application file for complete search history.

(56) References Cited

U.S. PATENT DOCUMENTS

| | | | |
|---|---|---|---|
| 6,092,053 A * | 7/2000 | Boesch et al. ................ | 705/26.8 |
| 6,378,075 B1 | 4/2002 | Goldstein et al. | |
| 7,159,180 B2 | 1/2007 | Ward | |
| 7,212,829 B1 * | 5/2007 | Lau et al. .................... | 455/456.1 |
| 2002/0007321 A1 * | 1/2002 | Burton ........................... | 705/26 |
| 2002/0032649 A1 * | 3/2002 | Selvarajan ...................... | 705/40 |
| 2002/0038255 A1 * | 3/2002 | Tarvydas et al. ............... | 705/26 |
| 2003/0083961 A1 * | 5/2003 | Bezos et al. .................... | 705/27 |
| 2005/0154651 A1 * | 7/2005 | Bezos et al. .................... | 705/27 |
| 2005/0210022 A1 | 9/2005 | Philippe et al. | |
| 2007/0192216 A1 * | 8/2007 | Arnold et al. .................. | 705/28 |
| 2007/0300161 A1 | 12/2007 | Bhatia et al. | |

OTHER PUBLICATIONS

Power, C. (Jan. 22, 1999). Electronic wallets make online shopping easier until now, shoppers had to go through the tedious business of entering their name, address and credit card details at every website visited. Irish Times.*

* cited by examiner

*Primary Examiner* — Resha Desai
(74) *Attorney, Agent, or Firm* — Cantor Colburn LLP

(57) ABSTRACT

An Automatic Sales Assistant ("ASA") automates the handling of electronic commerce transactions by gathering all of the relevant information with respect to an electronic commerce transaction being carried out by a customer using a computer and presenting it to the customer in a unified and convenient form (e.g., a template) that the customer may use to properly complete the electronic transaction (e.g., a purchase of retail goods using the Internet). The transaction may be an active document that resides in a private folder on the customer's computer. This type of active process handles all of the procedures related to any given electronic commerce transaction. Moreover, the ASA facilitates the proper resolution of any problems with a transaction by providing all of the necessary support material and information.

25 Claims, 3 Drawing Sheets

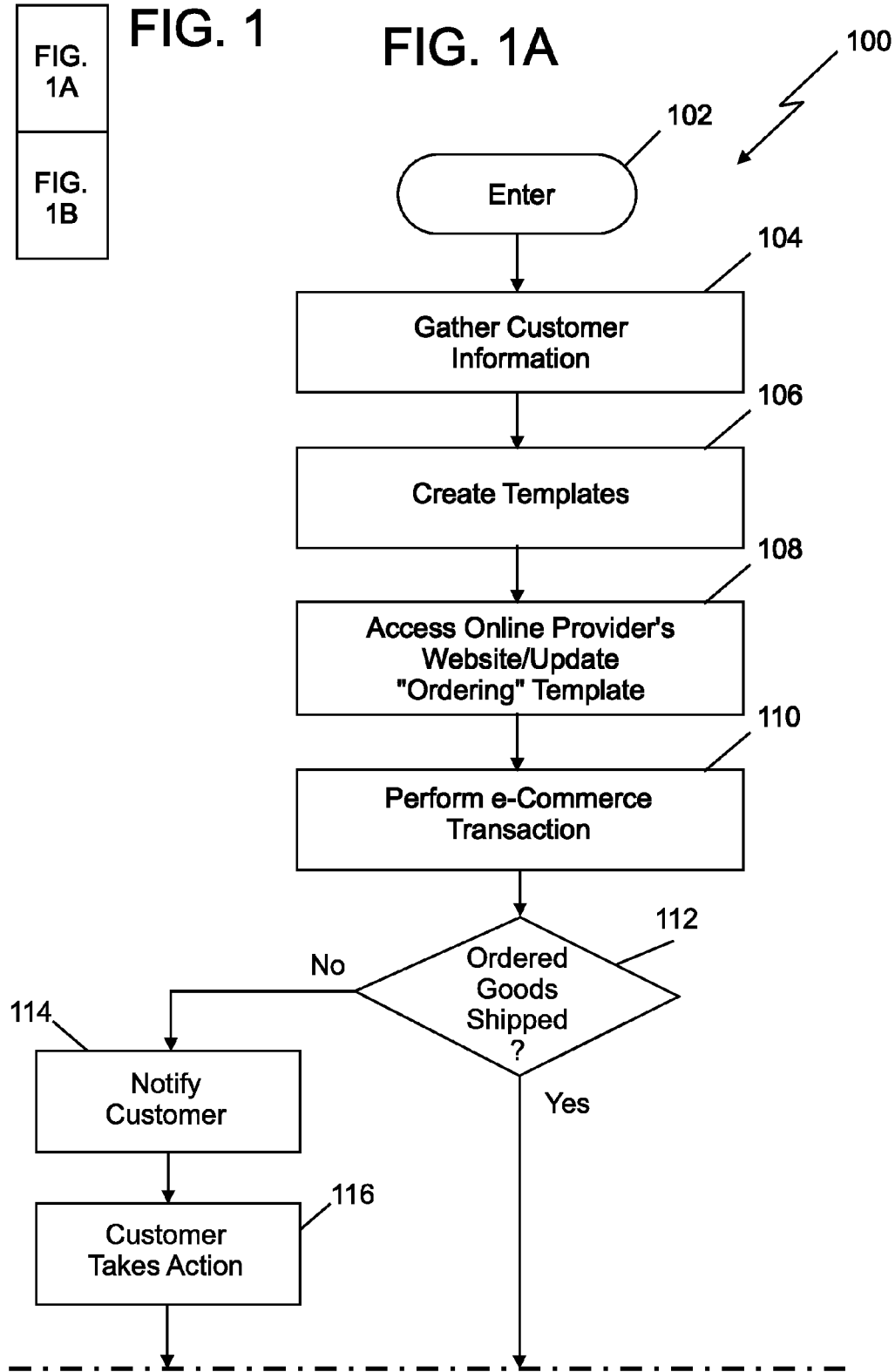

US 8,583,510 B2

AUTOMATIC SALES ASSISTANT FOR ELECTRONIC COMMERCE CUSTOMERS

BACKGROUND

The present invention relates generally to electronic commerce, and, more particularly, to an automatic sales assistant for electronic commerce customers.

With the recent rapid growth in electronic commerce ("e-commerce") there is an abundance of tools for enterprises engaged in providing e-commerce services, for example, the retail sale of goods or services over the Internet. At the same there is paucity of tools for users of e-commerce services. As a result customers must necessarily adapt to the style of each service provider when doing business therewith. Conducting electronic transactions can easily and quickly become relatively cumbersome, especially for people relatively unfamiliar with computers. The difficulty is compounded when taking into account payment and delivery processes, which introduce their own set of issues and other entities that must be dealt with. Since each company involved with e-commerce typically has its own online user interface, its own procedures and its own requirements, it is oftentimes difficult for the customer to manually initiate, process and follow an e-commerce transaction successfully to completion and resolve any problems if and when they arise. This is true especially when it is the first time that a customer is dealing electronically with a particular service provider.

BRIEF SUMMARY

According to an embodiment of the invention, an Automatic Sales Assistant ("ASA") automates the handling of electronic commerce transactions by gathering all of the relevant information with respect to an electronic commerce transaction being carried out by a customer using a computer and presenting it to the customer in a unified and convenient form (e.g., a template) that the customer may use to properly complete the electronic transaction (e.g., a purchase of retail goods using the Internet). The transaction may be an active document that resides in a private folder on the customer's computer. This type of active process control handles all of the procedures related to any given electronic commerce transaction. Moreover, the ASA facilitates the proper resolution of any problems with a transaction by providing all of the necessary support material and information.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description in conjunction with the accompanying drawings in which:

DETAILED DESCRIPTION

Figure 1B:
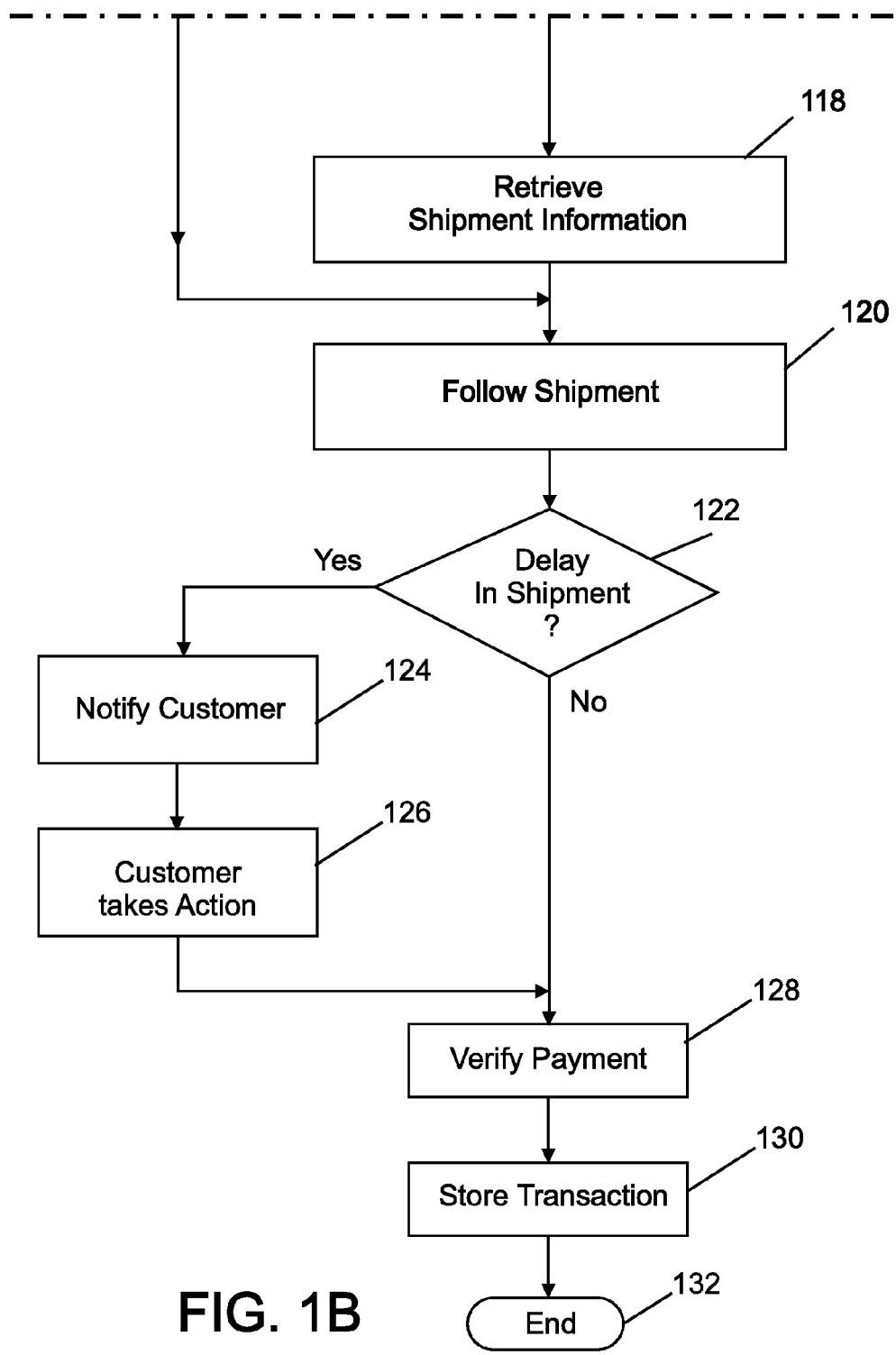
FIG. 1 is a flow diagram of an embodiment of the invention of a method for utilizing an automated sales assistant for electronic commerce transactions by a customer.

Referring to FIG. 1, there illustrated is a flow diagram of an embodiment of the invention that comprises a method 100 embodied, e.g., in software that runs on a computer (FIG. 2), wherein the method 100 automates the handling of electronic commerce transactions between electronic service providers (e.g., online sellers of goods or services) and customers utilizing computers to facilitate the online purchase of the desired goods or services. The method 100 utilizes an Automatic Sales Assistant ("ASA") implemented in software that gathers all of the relevant transaction information with respect to an electronic commerce transaction being carried out by a customer using a computer (e.g., the customer's relevant personal information needed to carry out a transaction and the information relating to a specific transaction). The ASA then presents the information to the customer in a uniform and convenient format (e.g., a template) on the computer display screen that the customer may use to properly complete the electronic transaction (e.g., a purchase of retail goods using the Internet), regardless of which one of a multitude of online sellers that the customer is using at any one particular time. Typically, each online seller of goods has its own unique set of interface screen(s) that the customers must deal with, where there is little or no uniformity between these screens as between different online sellers. The template(s) provide the uniformity and thus the simplicity that allows the customer to complete the transaction in a relatively easy and rapid manner. Each template may have a different purpose or function, for example one template for transaction information input and another template for problem occurrence. The transaction may be an active document that may reside in a private folder on the customer's computer. This type of active process control handles all of the procedures related to any given electronic commerce transaction. Moreover, the ASA facilitates the proper resolution of any problems with a transaction by notifying the customer and providing the customer with all of the necessary support material and information to resolve the problem. Thus, an embodiment of the invention facilitates the control and tracking of an electronic transaction by the customer, including throughout all stages of the process from placing the order to the delivery of the ordered goods to the customer. The ASA automates the entire administrative burden for carrying out an electronic transaction that today falls on the customers to complete manually.

With reference to the flow diagram of FIG. 1, an example utilized in an embodiment of the invention comprises an electronic transaction carried out using the Internet for the sale of one or more books to a customer by an online retail bookseller such as Amazon at its online website located at www.amazon.com. However, it should be understood that the flow diagram's description of the method 100 for carrying out a transaction with Amazon is purely exemplary; the electronic commerce transaction may be carried out with any one of a number of electronic commerce service providers (e.g., sellers of goods and/or services). After an enter step 102, the method 100 sets up the ASA in a step 104 by requesting the customer to enter all of the customer's personal information, such as the customer's name, addresses, credit card numbers and expiration dates, and any other relevant information needed to carry out a typical electronic commerce transaction. This information may be stored in a protected manner (e.g., password protected) in a private folder located on the customer's computer. This information may be entered manually into the computer by the customer only one time for all subsequent electronic transactions carried out by that customer. In this step 104 the customer may also change any of his/her relevant information as that information may change over time (e.g., a new address or new credit card number). As described hereinafter, the ASA uses this customer information as required to automatically carry out the electronic commerce transaction process.

Next, in a step 106 one or more templates may be created and stored on the customer's computer. The templates are "uniform" to the extent that a single template or set of templates are created that are function specific and are similar for each function regardless of the online retailer (e.g., Amazon, Barnes & Noble, eBay, etc.). For example, a single input information template or "ordering" template may be created in which various types of information necessary to carry out a transaction with every one of a plurality of different online service providers are provided in different fields of the template. Another template may comprise a problem template that is utilized when a certain type of problem occurs with the transaction, for example, a later than expected delivery of the ordered goods. In accordance with an embodiment of the invention, the ASA maintains templates for most frequent actions that may be required. For example, in the case when damaged goods are sent, from the customer's point of view this situation is the same regardless whether the goods were purchased from Amazon, Barnes & Noble, eBay, etc. However, procedures and required documentation may vary from one online retailer or shipper (e.g., UPS, FedEx, etc.) to another. Accordingly, the ASA may maintain a database of relevant procedure templates on the customer's computer that are activated as necessary.

In a step 108, the customer then accesses the Amazon Internet website from the customer's computer and invokes the customer's ASA. The method 100 may allow for communication with each of various electronic commerce service providers via the usual graphical user interface ("GUI") utilized by these service providers on their Internet websites. This can be achieved by automatic analysis of the computer screen images and automatic identification of the fields of interest of each of these service providers. Any modifications to the "ordering" template may be performed in this step 108 as a result of any information of the then-accessed website that previously was not available in the "ordering" template, thereby making the "ordering" template more complete. All of the usual Amazon Internet website screen displays are used transparently by the ASA so that browsing and on-line shopping by the customer are conducted unhindered by the ASA.

Once an online retailer's website has been accessed in the step 108 and the customer has decided to place an order, an electronic transaction is initiated and performed with the desired online retailer in a step 110 and the ASA e-commerce transaction flow as part of the method 100 is activated. The ASA transaction flow automatically completes all of the administrative information regarding the customer required by Amazon to complete the electronic transaction, including name, address and credit card information that was previously entered in the step 104. Input of the information regarding the specific goods to be ordered (e.g., one or more books from Amazon) to the service provider through use of the "ordering" template may be performed manually by the customer or by a keystroke simulation technique that simulates an input sequence (e.g., keystrokes, mouse clicks) necessary to enter the appropriate information. The transaction flow logic may be controlled either by the customer or may be adapted from a remote location as an additional service bundled with the ASA software offering. As part of this step 110, the ASA transaction flow also stores the receipt as a future record including the transaction time, and the flow gathers all of the necessary information for future use by the customer such that transactions from Amazon, Barnes & Noble, eBay, etc. have the same "look and feel" with regard to the "ordering" template. Each transaction may create a specific XML document that may be part of a searchable database on the customer's computer. The content tags may allow browsing according the transaction domain, date, status, etc. With appropriate encoding, the client's receipt can have equal legal footing with that of the server, and this way client will get the feeling that the client "owns" the transaction.

In the step 110, the ASA transaction flow also gathers delivery information including committed delivery dates. Next, at the appropriate time the flow logs on the to the Amazon website in a step 112 and checks whether the book(s) ordered by the customer have been sent. The ASA transaction flow raises an alarm in a step 114 in case of any delay in the shipment of the books to the customer and provides the customer with information regarding the reason(s) for the delay in shipment. The customer may then take the appropriate corrective action in a step 116. If the ordered book(s) have been shipped, the ASA transaction flow retrieves shipment information in a step 118 and automatically follows the shipment process in a step 120 from the initial point of departure (e.g., a regional warehouse), and checks in a step 122 for any delays in shipment, raising an alarm in a step 124 in the event of any delays in the shipment so that the customer can take appropriate corrective action in a step 126. The ASA transaction flow then verifies in a step 128 the payment process by automatic look up of the remittance in the customer's credit card and/or bank account. Upon successful transaction completion, the ASA transaction flow stores all of the receipts in a step 130 in the customer's private folder for future use, if necessary, including any warranty information, if applicable. The method 100 embodiment of the present invention then ends in a step 132.

The flow diagram in the Figures illustrates the architecture, functionality, and operation of possible implementations of systems, methods and computer program products according to various embodiments of the present invention. In this regard, each block in the flow diagram may represent a module, segment, or portion of code, which comprises one or more executable instructions for implementing the specified logical function(s). It should also be noted that, in some alternative embodiments, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the flow diagram, and combinations of blocks in the flow diagram, can be implemented by special- or general-purpose hardware-based systems, as described hereinafter, that perform the specified functions or acts, or combinations of special- or general-purpose hardware and computer instructions.

Figure 2:
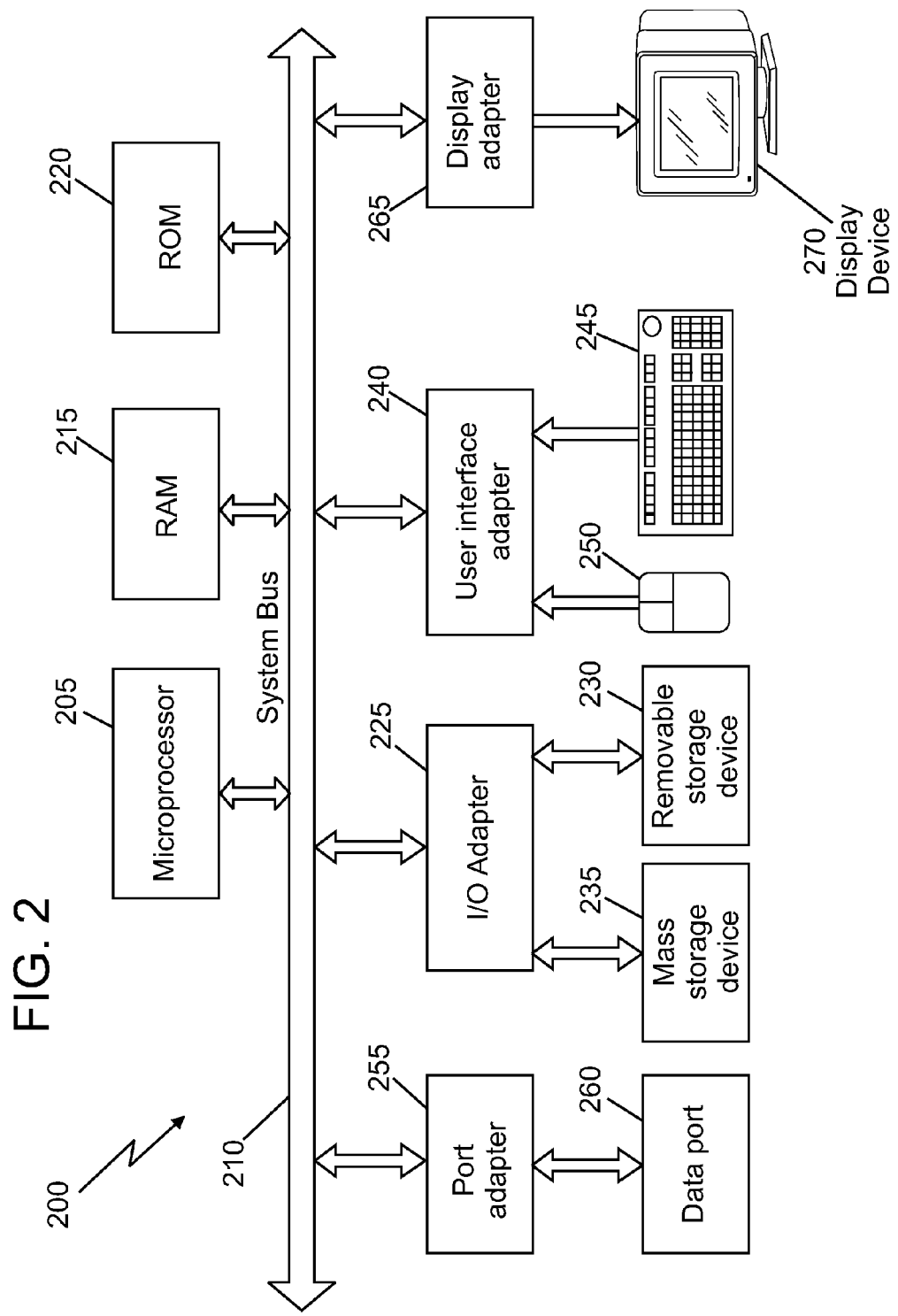
FIG. 2 is a schematic block diagram of a general-purpose computer suitable for practicing embodiments of the present invention.

Generally, the method embodiments disclosed herein may be practiced with a general-purpose computer and the method embodiments may be coded as a set of instructions on removable or hard media for use by the general-purpose computer. FIG. 2 is a schematic block diagram of a general-purpose computer suitable for practicing embodiments of the present invention. In FIG. 2, computer system 200 has at least one microprocessor or central processing unit (CPU) 205. CPU 205 is interconnected via a system bus 210 to a random access memory (RAM) 215, a read-only memory (ROM) 220, an input/output (1/0) adapter 225 for connecting a removable data and/or program storage device 230 and a mass data and/or program storage device 235, a user interface adapter 240 for connecting a keyboard 245 and a mouse 250, a port adapter 255 for connecting a data port 260 and a display adapter 265 for connecting a display device 270.

ROM 220 contains the basic operating system for computer system 200. The operating system may alternatively reside in RAM 215 or elsewhere as is known in the art. Examples of removable data and/or program storage device 230 include magnetic media such as floppy drives and tape drives and optical media such as CD ROM drives. Examples of mass data and/or program storage device 235 include hard disk drives and non-volatile memory such as flash memory. In addition to keyboard 245 and mouse 250, other user input devices such as trackballs, writing tablets, pressure pads, microphones, light pens and position-sensing screen displays may be connected to user interface 240. Examples of display devices include cathode-ray tubes (CRT) and liquid crystal displays (LCD).

A computer program with an appropriate application interface may be created by one of skill in the art and stored on the system or a data and/or program storage device to simplify the practicing embodiments of the invention. In operation, information for or the computer program created to run the present invention is loaded on the appropriate removable data and/or program storage device 230, fed through data port 260 or typed in using keyboard 245.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in the flow diagram of FIG. 1.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described to best explain the principles of the invention and the practical application, and to enable others of ordinary skill in the art to understand the invention for various embodiments with various modifications as are suited to the particular use contemplated.

The flow diagram depicted herein is just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While various embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:

gathering certain information relating to a customer at a computer, the computer associated with the customer, the certain information gathered by identifying images and fields displayed on a webpage of an online provider of goods and/or services among a plurality of online providers of goods and/or services;

storing the gathered information in a storage medium that is associated with the computer;

creating, via the computer, a plurality of templates corresponding to a respective transaction of goods and/or services provided by the plurality of online providers, the plurality of templates including a first template having the gathered information, wherein the first template is a uniform function based template that relates to ordering goods and/or services over the Internet from any of the plurality of online providers of goods and/or services utilizing the gathered information, the first template comprising a single set of inputs for all of the plurality of online providers of goods and/or services, wherein the first template is displayed at predetermined times on a visual display that is associated with the computer;

storing the first template in the storage medium;

accessing, via the computer, an Internet website of one of a plurality of online providers, and automatically analyzing images and fields of interests displayed by the website;

determining, via the computer, an electronic commerce transaction to be performed among a plurality of different electronic commerce transaction provided by the online provider based on the analyzed images and fields of interests;

selecting the first template among the plurality of templates based on the determined electronic commerce transaction and performing the electronic commerce transaction using the selected first template, the performing including:

performing, via the computer, an electronic commerce transaction that comprises purchasing of goods and/or services by the customer from the accessed one of the plurality of online providers utilizing the first template and the information relating to the customer for each electronic commerce transaction performed, the electronic commerce transaction performed at the Internet website of one of the plurality of online providers;

tracking, via the computer, shipment of the purchased goods and/or services, the tracking comprising automatically receiving shipment progress from an initial point of departure and automatically checking shipment progress;

verifying, via the computer, payment by the customer of the purchased goods and/or services; and storing all information relating to the performed electronic commerce transaction in the storage medium.

2. The method of claim 1, wherein storing all information relating to the performed electronic commerce transaction in the storage medium includes storing all information relating to the performed electronic commerce transaction in the storage medium using password protection.

3. The method of claim 1, wherein the gathered information includes personal information.

4. The method of claim 1, wherein performing an electronic commerce transaction that comprises purchasing of goods and/or services by the customer from the accessed one of the plurality of online providers includes entering into the first template information relating to goods and/or services desired to be purchased by the customer.

5. The method of claim 1, wherein tracking shipment of the purchased goods and/or services includes notifying the customer of any problem relating to the shipment of the goods, wherein the customer can take any corrective action in response thereto.

6. The method of claim 1, wherein tracking shipment of the purchased goods and/or services includes creating a second template relating to shipment information regarding the purchased goods and/or services, wherein the second template is stored in the storage medium.

7. The method of claim 1, wherein each performed electronic transaction has an associated XML document that is stored in the storage medium as part of a searchable database.

8. A computer program product stored on a non-transitory computer readable medium, the computer program product configured to perform an electronic commerce transaction, the computer program product comprising:

the non-transitory computer readable storage medium having computer readable program code embodied therewith, the computer readable program code comprising: computer readable program code configured to implement a method for performing an electronic commerce transaction, the method comprising the steps of:

gathering certain information relating to a customer at a computer, the computer associated with the customer, the certain information gathered by identifying images and fields displayed on a webpage of an online provider of goods and/or services among a plurality of online providers of goods and/or services;

storing the gathered information in the storage medium;

creating a plurality of templates corresponding to a respective transaction of goods and/or services among a plurality of transactions provided by the plurality of online providers, the plurality of templates including a first template having the gathered information, wherein the first template is a uniform function based template that relates to ordering goods and/or services over the Internet from any of the plurality of online providers of goods and/or services utilizing the gathered information, the first template comprising a single set of inputs for all of the plurality of online providers of goods and/or services, wherein the first template is displayed at predetermined times on a visual display;

storing the first template in the storage medium;

accessing an Internet website of one of a plurality of online providers and automatically analyzing images and fields of interests displayed by the website;

automatically determining an electronic commerce transaction to be performed among a plurality of different electronic commerce transaction provided by the online provider based on the analyzed images and fields of interests;

selecting the first template among the plurality of templates based on the determined electronic commerce transaction and performing the electronic commerce transaction using the selected first template, the performing including:

performing an electronic commerce transaction that comprises purchasing of goods and/or services by the customer from the accessed one of the plurality of online providers utilizing the first template and the information relating to the customer for each electronic commerce transaction performed, the electronic commerce transaction performed at the Internet website of one of the plurality of online providers;

tracking shipment of the purchased goods and/or services, the tracking comprising automatically receiving shipment progress from an initial point of departure and automatically checking shipment progress;

verifying payment by the customer of the purchased goods and/or services; and storing all information relating to the performed electronic commerce transaction in the storage medium.

9. The computer program product of claim 8, wherein the storage medium is part of a computer.

10. The computer program product of claim 8, wherein the gathered information includes personal information.

11. The computer program product of claim 8, wherein performing an electronic commerce transaction that comprises purchasing of goods and/or services by the customer from the accessed one of the plurality of online providers includes entering into the first template information relating to goods and/or services desired to be purchased by the customer.

12. The computer program product of claim 8, wherein tracking shipment of the purchased goods and/or services includes notifying the customer of any problem relating to the shipment of the goods, wherein the customer can take any corrective action in response thereto.

13. The computer program product of claim 8, wherein tracking shipment of the purchased goods and/or services includes creating a second template relating to shipment information regarding the purchased goods and/or services, wherein the second template is stored in the storage medium.

14. The computer program product of claim 8, wherein each performed electronic transaction has an associated XML document that is stored as part of a searchable database on a computer.

15. A system for performing an electronic commerce transaction, comprising:

a computing network including a processing device in communication with one or more computer memory storage devices; and the computing network further configured to implement a method for performing an electronic commerce transaction, the method further comprising:

gathering certain information relating to a customer at the processing device, the processing device associated with the customer, the certain information gathered by identifying images and fields displayed on a webpage of an online provider of goods and/or services among a plurality of online providers of goods and/or services;

storing the gathered information in at least one of the one or more computer memory storage devices;

creating a plurality of templates corresponding to a respective transaction of goods and/or services provided by the plurality of online providers, the plurality of templates including a first template having the gathered information, wherein the first template is a uniform function based template that relates to ordering goods and/or services over the Internet from any of the plurality of online providers of goods and/or services utilizing the gathered information, the first template comprising a single set of inputs for all of the plurality of online providers of goods and/or services, wherein the first template is displayed at predetermined times on a visual display;

storing the first template in at least one of the one or more computer memory storage devices;

accessing an Internet website of one of a plurality of online providers, and automatically analyzing images and fields of interests displayed by the website;

automatically determining an electronic commerce transaction to be performed among a plurality of different electronic commerce transaction provided by the online provider based on the analyzed images and fields of interests;

selecting the first template among the plurality of templates based on the determined electronic commerce transaction and performing the electronic commerce transaction using the selected first template, the performing including:

performing an electronic commerce transaction that comprises purchasing of goods and/or services by the customer from the accessed one of the plurality of online providers utilizing the first template and the information relating to the customer for each electronic commerce transaction performed, the electronic commerce transaction performed at the Internet website of one of the plurality of online providers;

tracking shipment of the purchased goods and/or services, the tracking comprising automatically receiving shipment progress from an initial point of departure and automatically checking shipment progress;

verifying payment by the customer of the purchased goods and/or services; and storing all information relating to the performed electronic commerce transaction in at least one of the one or more computer memory storage devices.

16. The system of claim 15, wherein the one or more computer memory storage devices are part of a computer.

17. The system of claim 15, wherein the gathered information includes personal information.

18. The system of claim 15, wherein performing an electronic commerce transaction that comprises purchasing of goods and/or services by the customer from the accessed one of the plurality of online providers includes entering into the first template information relating to goods and/or services desired to be purchased by the customer.

19. The system of claim 15, wherein tracking shipment of the purchased goods and/or services includes notifying the customer of any problem relating to the shipment of the goods, wherein the customer can take any corrective action in response thereto.

20. The system of claim 15, wherein tracking shipment of the purchased goods and/or services includes creating a second template relating to shipment information regarding the purchased goods and/or services, wherein the second template is stored in at least one of the one or more computer memory storage devices.

21. The system of claim 15, wherein each performed electronic transaction has an associated XML document that is stored as part of a searchable database on a computer.

22. A method, comprising:

gathering and storing on a computer certain information relating to a customer, the computer associated with the customer, the certain information gathered by identifying images and fields displayed on a webpage of an online provider of goods and/or services among a plurality of online providers of goods and/or services;

creating a plurality of templates corresponding to a respective transaction of goods and/or services provided by the plurality of online providers, the plurality of templates including a first template having the gathered information, wherein the first template is a uniform function based template that relates to ordering goods and/or services over the Internet from any of the plurality of online providers of goods and/or services utilizing the gathered information, the first template comprising a single set of inputs for all of the plurality of online providers of goods and/or services, wherein the first template is stored on the computer;

accessing an Internet website of one of the plurality of online providers, and automatically analyzing images and fields of interests displayed by the website;

determining, via the computer, an electronic commerce transaction to be performed among a plurality of different electronic commerce transaction provided by the online provider based on the analyzed images and fields of interests;

selecting the first template among the plurality of templates based on the determined electronic commerce transaction and performing the electronic commerce transaction using the selected first template, the performing including:

performing an electronic commerce transaction that comprises purchasing of goods and/or services by the customer from the accessed one of the plurality of online providers utilizing the first template and the information relating to the customer for each electronic commerce transaction performed, the electronic commerce transaction performed at the Internet website of one of the plurality of online providers;

tracking shipment of the purchased goods and/or services, the tracking comprising automatically receiving shipment progress from an initial point of departure and automatically checking shipment progress;

detecting if the goods and/or services have shipped;

notifying the customer that the goods and/or services have not shipped in response to determining that the goods and/or services have not shipped;

verifying payment by the customer of the purchased goods and/or services; and storing on the computer all information relating to the performed electronic commerce transaction.

23. The method of claim 22, wherein performing an electronic commerce transaction that comprises purchasing of goods and/or services by the customer from the accessed one of the plurality of online providers includes entering into the first template information relating to goods and/or services desired to be purchased by the customer.

24. The method of claim 22, wherein tracking shipment of the purchased goods and/or services includes notifying the customer of any problem relating to the shipment of the goods, wherein the customer can take any corrective action in response thereto.

25. The method of claim 22, wherein tracking shipment of the purchased goods and/or services includes creating a second template relating to shipment information regarding the purchased goods and/or services, wherein the second template is stored on the computer.

* * * * *